United States Patent
Kang et al.

(10) Patent No.: US 11,915,513 B2
(45) Date of Patent: Feb. 27, 2024

(54) APPARATUS FOR LEVELING PERSON IMAGE AND OPERATING METHOD THEREOF

(71) Applicants: NCSOFT CORPORATION, Seongnam-si (KR); INDUSTRY-ACADEMIC COOPERATION FOUNDATION, YONSEI UNIVERSITY, Seoul (KR)

(72) Inventors: Seoungyoon Kang, Incheon (KR); Min Jae Kim, Seongnam-si (KR); Moo Kyung Song, Seongnam-si (KR); Hyunjung Shim, Incheon (KR); Gun Hee Lee, Seongnam-si (KR)

(73) Assignees: NCSOFT CORPORATION, Seongnam-si (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 0 days.

(21) Appl. No.: 17/726,780

(22) Filed: Apr. 22, 2022

(65) Prior Publication Data
US 2022/0375254 A1 Nov. 24, 2022

(30) Foreign Application Priority Data
Apr. 22, 2021 (KR) .................. 10-2021-0052661

(51) Int. Cl.
*G06K 9/00* (2022.01)
*G06V 40/16* (2022.01)
*G06T 11/60* (2006.01)

(52) U.S. Cl.
CPC ............ *G06V 40/161* (2022.01); *G06T 11/60* (2013.01); *G06T 2207/30201* (2013.01)

(58) Field of Classification Search
CPC ...... G06V 40/161; G06V 10/82; G06V 40/18; G06T 11/60; G06T 2207/30201; G06T 7/11
See application file for complete search history.

(56) References Cited

U.S. PATENT DOCUMENTS

| | | | |
|---|---|---|---|
| 7,272,267 B1 | 9/2007 | Nakajima | |
| 8,520,975 B2 | 8/2013 | Wang et al. | |
| 2020/0082157 A1* | 3/2020 | Susskind | G06V 40/18 |
| 2021/0019541 A1* | 1/2021 | Wang | G06V 10/82 |
| 2022/0101577 A1* | 3/2022 | Chakrabarty | G06T 7/11 |

OTHER PUBLICATIONS

Shanyan Guan, et al., "Collaborative Learning for Faster StyleGAN Embedding", Jul. 3, 2020, pp. 4321-4330.

* cited by examiner

*Primary Examiner* — Abdul-Samad A Adediran
(74) *Attorney, Agent, or Firm* — Sughrue Mion, PLLC

(57) ABSTRACT

Provided are an apparatus for performing leveling of a person image and an operating method thereof. The method includes: receiving an original person image; selecting an arbitrary latent vector in a latent space; generating a virtual person image based on the latent vector; optimizing the latent vector such that identity similarity between the original person image and the virtual person image increases; manipulating the optimized latent vector; and generating a levelled person image corresponding to the original person image, by using the manipulated latent vector.

15 Claims, 15 Drawing Sheets

APPARATUS FOR LEVELING PERSON IMAGE AND OPERATING METHOD THEREOF

CROSS-REFERENCE TO RELATED APPLICATION

This application is based on and claims the benefits of § 119 to Korean Patent Application No. 10-2021-0052661, filed on Apr. 22, 2021, in the Korean Intellectual Property Office, the disclosure of which is incorporated by reference herein in its entirety.

BACKGROUND

1. Field

The present disclosure relates to apparatuses for performing leveling of a person image and operating methods thereof.

2. Description of the Related Art

A Generative Adversarial Network (GAN) is used to achieve high performance in wide-ranging computer vision applications designed to provide various functions such as image generation, super-resolution, video prediction, style transmission, visual tracking, 3D reconstruction, segmentation, object detection, reinforcement learning and medical imaging.

Unlike existing deep learning algorithms such as Convolution Neural Network (CNN) and Recurrent Neural Network (RNN), the GAN generates image and voice data by an unsupervised learning method.

As such, the GAN is a network for generative models, which is a subfield of machine learning and computer vision, and various studies are being conducted to increase the quality of a generated image similar to an actual image.

The above-described background art is technical information possessed by the inventor for the derivation of the present disclosure or acquired in the process of deriving the present disclosure, and cannot necessarily be said to be a well-known technique disclosed to the general public prior to the filing of the present disclosure.

SUMMARY

Provided are apparatuses for performing leveling of a person image and an operating method thereof.

The objectives to be solved by the present disclosure is not limited to the above-described ones, and other objectives and advantages of the present disclosure not mentioned can be understood from the following description, and more clearly understood by the embodiments of the present disclosure. In addition, it will be appreciated that the objectives and advantages to be solved by the present disclosure may be implemented by means and combinations thereof indicated in the claims.

Additional aspects will be set forth in part in the description which follows and, in part, will be apparent from the description, or may be learned by practice of the presented embodiments of the disclosure.

According to a first aspect of an embodiment, a method for performing leveling of a person image includes: receiving an original person image; selecting an arbitrary latent vector in a latent space; generating a virtual person image based on the latent vector; optimizing the latent vector such that identity similarity between the original person image and the virtual person image increases; manipulating the optimized latent vector; and generating a levelled person image corresponding to the original person image, by using the manipulated latent vector.

According to a second aspect of another embodiment, an apparatus for performing leveling of a person image, includes: a memory storing at least one program; and a processor configured to perform an operation by executing the at least one program, wherein the processor is configured to receive an original person image including a person object, select an arbitrary latent vector in a latent space, generate a virtual person image based on the latent vector; optimize the latent vector such that identity similarity between the original person image and the virtual person image increases, manipulate the optimized latent vector, and generate a levelled person image corresponding to the original person image, by using the manipulated latent vector.

According to a third aspect of another embodiment, a method of generating a character face image, includes: receiving an original person image from a user terminal; converting the original person image into a levelled person image; and generating a character face image corresponding to the levelled person image.

According to a fourth aspect of another embodiment, a game server for generating a character face image, includes: a communication unit configured to perform communication with a user terminal; a memory storing at least one program; and a processor configured to perform an operation by executing the at least one program, wherein the communication unit receives an original person image from the user terminal, and the processor is configured to convert the original person image into a levelled person image, and generate a character face image corresponding to the levelled person image.

According to a fifth aspect of another embodiment, a computer-readable recording medium having recorded thereon a program for executing the methods according to the first aspect to the third aspect on a computer is included.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
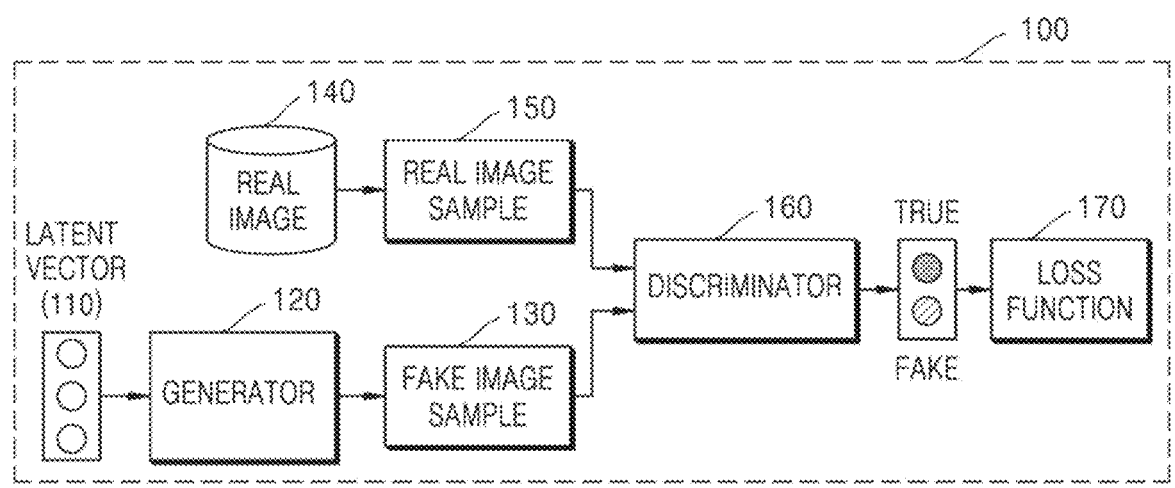
FIG. 1 is a diagram illustrating an example structure of an image generating apparatus according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

The advantages and features of the present disclosure and methods of achieving the advantages and features will become apparent with reference to embodiments described in detail with reference to the accompanying drawings. The present disclosure may, however, be embodied in many different forms and should not be construed as being limited to the embodiments set forth herein, and it is to be appreciated that all changes, equivalents, and substitutes that do not depart from the spirit and technical scope of the present disclosure are encompassed in the present disclosure.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

The present disclosure may be described in terms of functional block components and various processing steps. Such functional blocks may be realized by any number of hardware and/or software components configured to perform the specified functions. For example, the functional blocks of the present disclosure may be realized by one or more microprocessors or circuit elements for certain functions. Also, for example, the functional blocks of the present disclosure may be implemented with various programming or scripting languages. The functional blocks may be implemented in algorithms that execute on one or more processors. Furthermore, the present disclosure could employ any number of conventional techniques for electronics configuration, signal processing and/or control, data processing and the like. The terms "mechanism" and "element" are used broadly and are not limited to mechanical or physical embodiments.

Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device.

Hereinafter, an operation performed by a user may refer to an operation performed by the user by using a user terminal. As an example, a command corresponding to an operation performed by the user may be input to the user terminal through an input device (e.g., keyboard, mouse, etc.) embedded in or additionally connected to the user terminal. As another example, a command corresponding to an operation performed by the user may be input to the user terminal through a touch screen of the user terminal. Here, an operation performed by a user may include a certain gesture. For example, the gesture may include a tap, touch & hold, double tap, drag, panning, flick, drag and drop, and the like.

Hereinafter, a levelled person image may refer to an image of a person in which the person stares at the front and shows a neutral emotion, and the illumination is illuminating the front of the face.

Hereinafter, the present disclosure will be described in detail with reference to the accompanying drawings.

FIG. 1 is a diagram illustrating an example structure of an image generating apparatus according to an embodiment.

Referring to FIG. 1, a Generative Adversarial Network (GAN) including a generator 120 and a discriminator 160 may be used as an image generating apparatus 100.

The generator 120 may generate a new instance by using random noise.

The discriminator 160 may determine whether each data instance reviewed by evaluating the authenticity of data is an actual training data set or not, that is, whether an input image is a real image or a fake image. Also, when the features of a data instance is given, a label or category to which relevant data belongs may be predicted.

The generator 120 is a function that receives a random vector or a latent vector 110 'z' as an input and outputs a fake image sample 130. Here, 'z' may simply be a value randomly extracted from a uniform distribution or a normal distribution. The generator 120 may be a function that maps a simple distribution as above to a complex distribution such as human face images. A space in which the 'z' vector exists is also called a latent space.

The aim of the generator 120 is to create fake data of a level that is indistinguishable from the real one and is enough to deceive the discriminator 160.

The discriminator 160 is trained using the fake data created through real world images and the generator 120, and has a function of distinguishing whether a sample is real or fake. The discriminator 160 is a function that receives an image as an input and outputs a probability that the image is real, as one number between 0 and 1.

The aim of the image generating apparatus 100 may be that, as the discriminator 160 is continuously trained to better discriminate, and the generator 120 is continuously trained to better deceive the discriminator 160, the generator 120 is finally able to create data that is hardly distinguishable as to whether the data is real or fake, and the distinguishing performance of the discriminator 160 is also gradually improved. The image generating apparatus 100 aims at developing the generator 120 and the discriminator 160 to a level where it is difficult to distinguish whether data is real or fake, by allowing the generator 120 and the discriminator 160 to undergo adversarial training.

Figure 2:
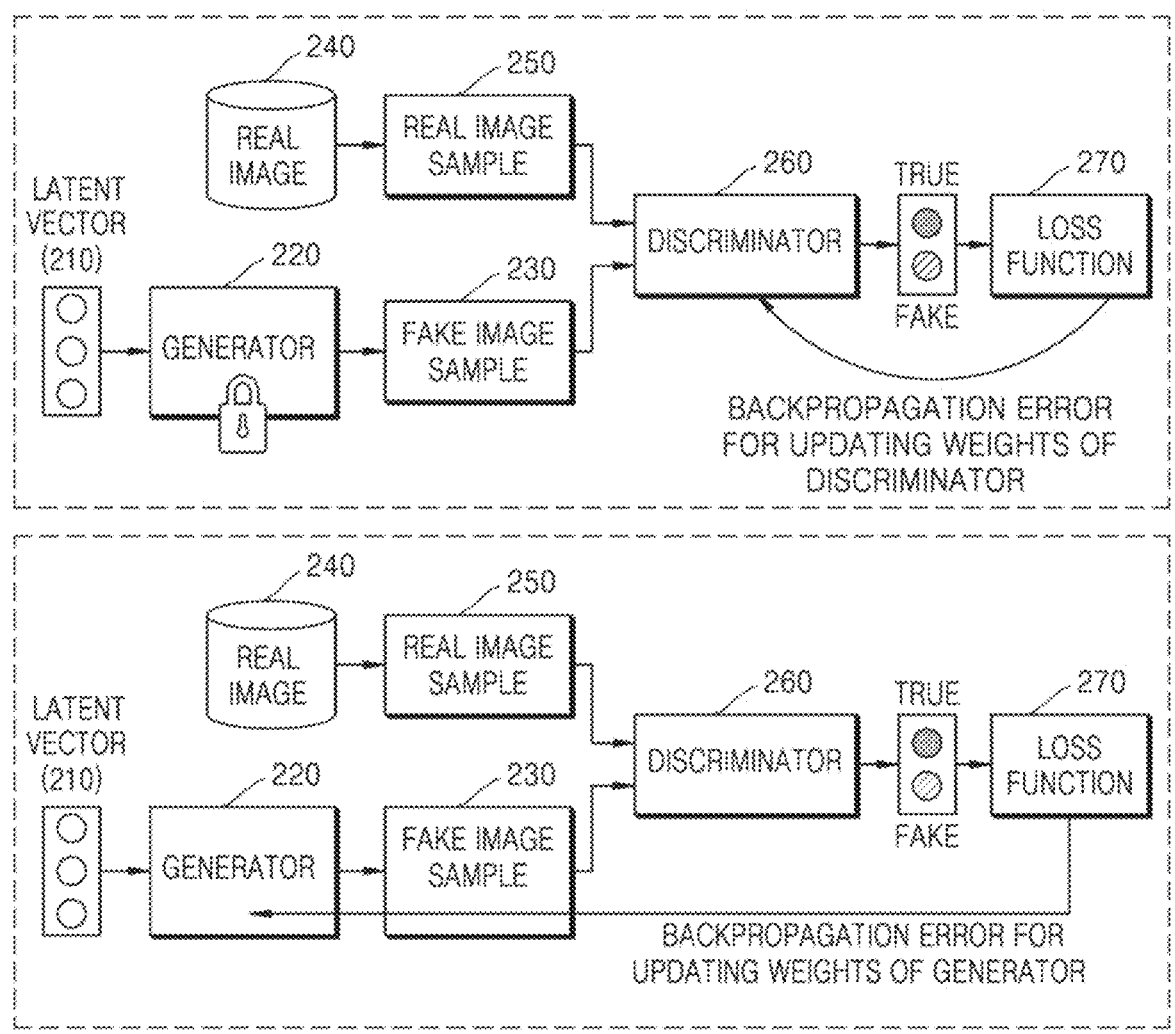
FIG. 2 is a diagram for describing a learning method of an image generating apparatus, according to an embodiment.

FIG. 2 is a diagram for describing a learning method of an image generating apparatus, according to an embodiment.

Learning of an image generating apparatus 200 is conducted in two steps, and in a first step, a generator 220 is fixed, and a discriminator 260 is trained. The discriminator 260 already knows which is real and which is fake, and thus, in the same manner as a training method of an existing discriminant network, a loss function 270 is defined, and errors are back-propagated while updating weights.

Referring to FIG. 2, when a real image sample 250 from a real image 240 is input to the discriminator 260, a probability value close to 1 is to be output, and when a fake image sample 230 is input, a probability value close to 0 is to be output. Accordingly, the loss function 270 of the discriminator 260 consists of a sum of the two. A sum of a difference between an output value when the real image sample 250 is input and 1, and a difference between an output value when the fake image sample 230 is input and 0 is a loss function of a separator. Training of the discriminator 260 may be performed by updating parameters of the discriminator 260 in a direction in which a value of the loss function is minimized.

In a second step, the discriminator 260 is fixed, and the generator 220 is trained. As the purpose of the generator 220 is to deceive the discriminator 260, the generator 220 is trained in a direction in which the discriminator 260 is deluded. In other words, when a fake image generated by the generator 220 is put into the discriminator 260, an output value therefrom is to be close to 1. A degree to which this value has fallen from 1 becomes a loss function of the generator 220, and the generator 220 is trained to minimize the same.

By repeatedly performing the above two-step process, the discriminator 260 and the generator 220 may repeatedly develop and reach an equilibrium state.

Figure 3:
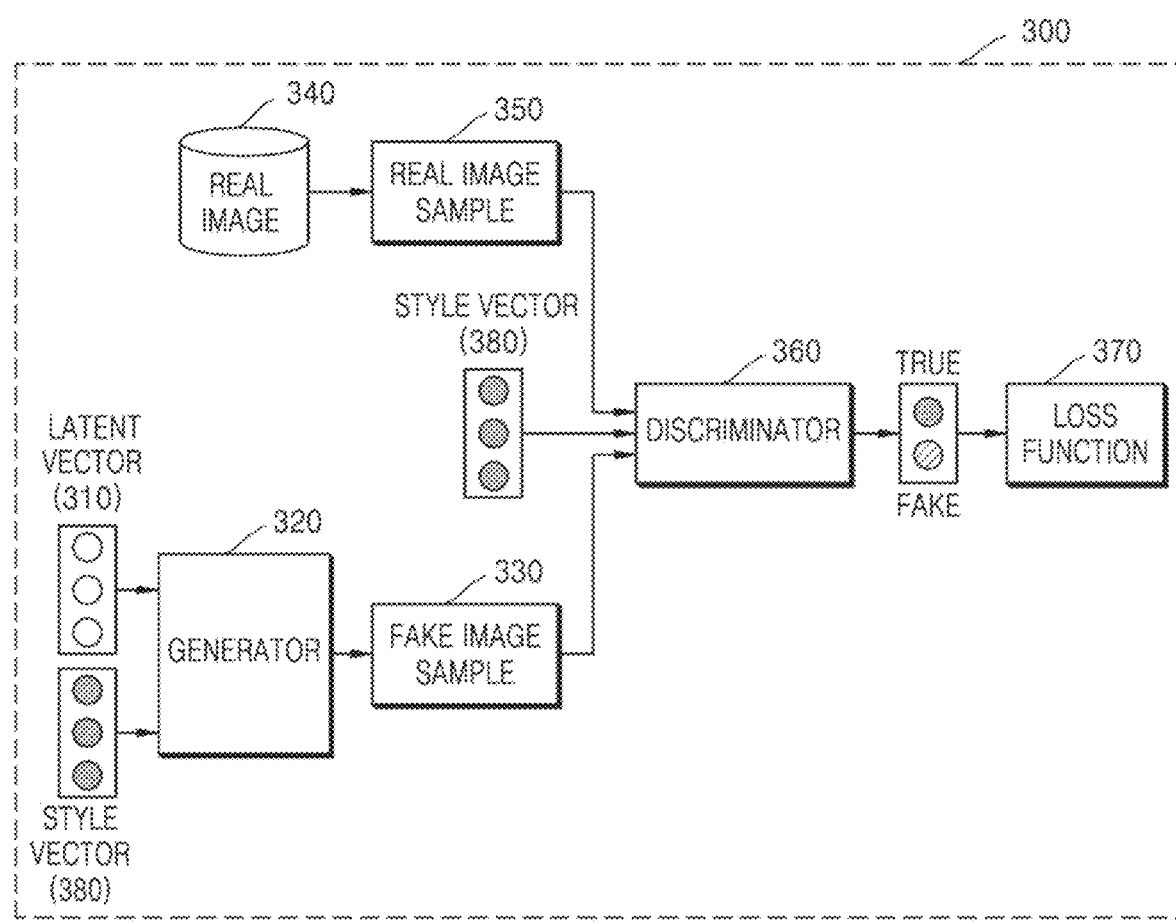
FIG. 3 is a diagram for describing a method of generating an image by further using a style vector, according to an embodiment.

FIG. 3 is a diagram for describing a method of generating an image by further using a style vector, according to an embodiment.

Referring to FIG. 3, an image generating apparatus 300 illustrated in FIG. 3 is similar to the image generating apparatus 100 illustrated in FIG. 1, except that a style vector 380 is further added as an input to a generator 320 and a discriminator 360.

The image generating apparatus 300 performs training by adding the style vector 380 to a latent vector 310.

The generator 320 concatenates the latent vector 310 and the style vector 380 to generate a fake image sample 330, and the discriminator 360 also concatenates the fake image sample 330 and the style vector 380 and uses them as an input to the discriminator 360. However, when the style vector 380 is further combined, the method therefor is not necessarily limited to concatenation, and a simple sum or projection may also be used.

By further using the style vector 380 during training, the image generating apparatus 300 may generate an image by further reflecting image features corresponding to the style vector 380. For example, when the style vector 380 relates to a feature corresponding to hair color information of a person, the image generating apparatus 300 may generate an image by further using the hair color information.

Figure 4:
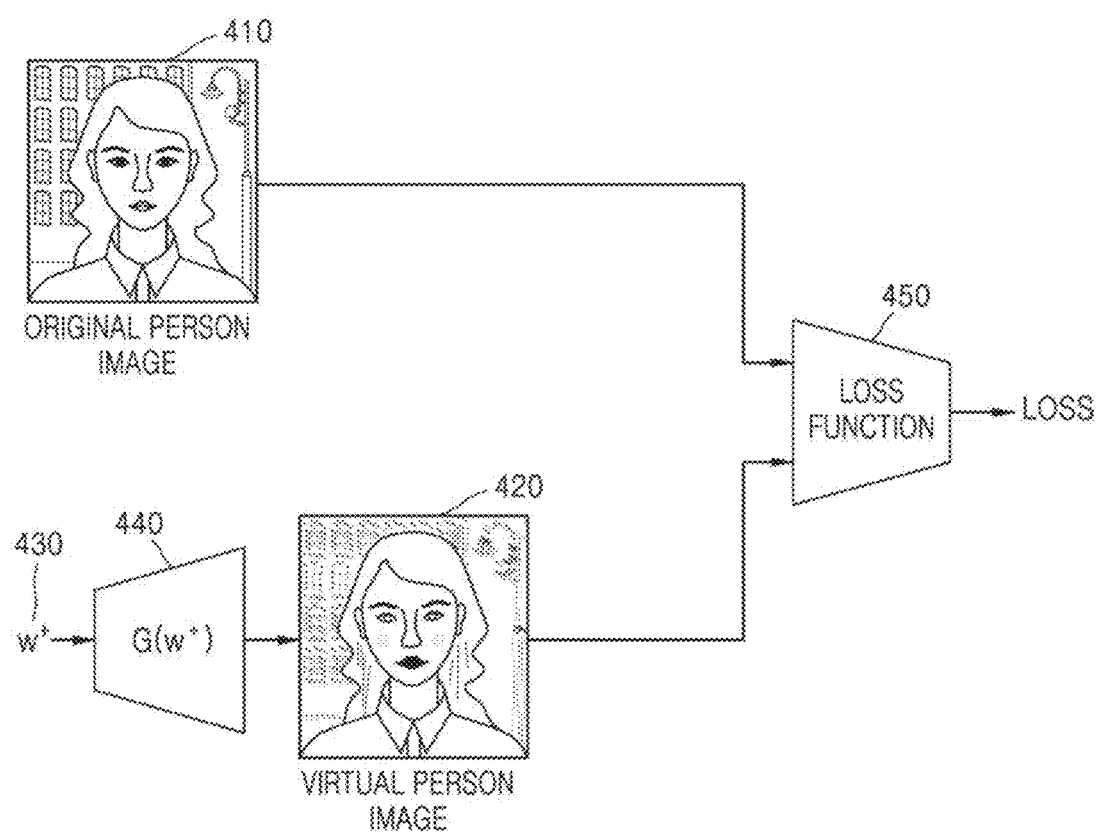
FIG. 4 is a diagram for describing a method of increasing identity similarity between an original person image and a virtual person image, according to an embodiment.

FIG. 4 is a diagram for describing a method of increasing an identity similarity between an original person image and a virtual person image, according to an embodiment.

A leveling apparatus may select an arbitrary latent vector 430 in a latent space. The leveling apparatus may select a mode in the latent space as the arbitrary latent vector 430 or randomly select the arbitrary latent vector 430, but the selection method is not limited thereto.

The leveling apparatus may input the latent vector 430 to a generator 440. The generator 440 is a function included in the image generating apparatuses described above with reference to FIGS. 1 to 3, and the generator 440 may be implemented as a GAN generator, a StyleGAN generator, a StyleGAN2 generator, etc., but the implementation method of the generator 440 is not limited thereto. The generator 440 may be a generator whose training has been completed by the method described above with reference to FIGS. 1 to 3.

The generator 440 may generate a virtual person image 420 by receiving the latent vector 430 as an input.

The leveling apparatus may receive an original person image 410 from the outside.

The leveling apparatus may input the original person image 410 and the virtual person image 420 to a loss function 450. As the loss function 450, Learned Perceptual Image Patch Similarity (LPIPS) may be used, but is not limited thereto. The loss function 450 may calculate a loss as an output value. This may be expressed as Equation 1 below.

In Equation 1, X is the original person image 410, G is a generator (for example, StyleGAN2 generator), $w^+$ denotes the latent vector 430.

$$\mathcal{L}(\omega^+; X) = \text{LPIPS}(X, G(\omega^+))$$ [Equation 1]

The leveling apparatus may optimize the latent vector 430 in a direction in which loss is reduced. In the optimization process, the latent vector 430 may be continuously updated. As the loss of the loss function 450 decreases, an identity similarity between the original person image 410 and the virtual person image 420 may increase.

Figure 5:
FIG. 5 is an example diagram for describing an original person image excluded in a leveling process according to an embodiment.

FIG. 5 is an example diagram for describing an original person image excluded in a leveling process according to an embodiment.

The leveling apparatus may determine whether a person is included in an original image received from the outside. For example, the leveling apparatus may determine whether a person is included in the original image, by recognizing feature points of the person's face, such as eyes and nose.

Also, the leveling apparatus may exclude those images that do not meet certain criteria, from among original person images.

In an embodiment, the leveling apparatus may exclude images in which a face in the original person image is blocked by a certain ratio or more. Referring to FIG. 5, when foreign substances are attached to a person's face or when the person's face is covered by another object, the leveling apparatus may exclude such images.

Also, the leveling apparatus may exclude images in which the eyes and mouth (of the person's face in the original person image are not aligned.

As described above, even when a person is included in an original image, the leveling apparatus may exclude, from a leveling process, images that may limit performance.

Figure 6A:
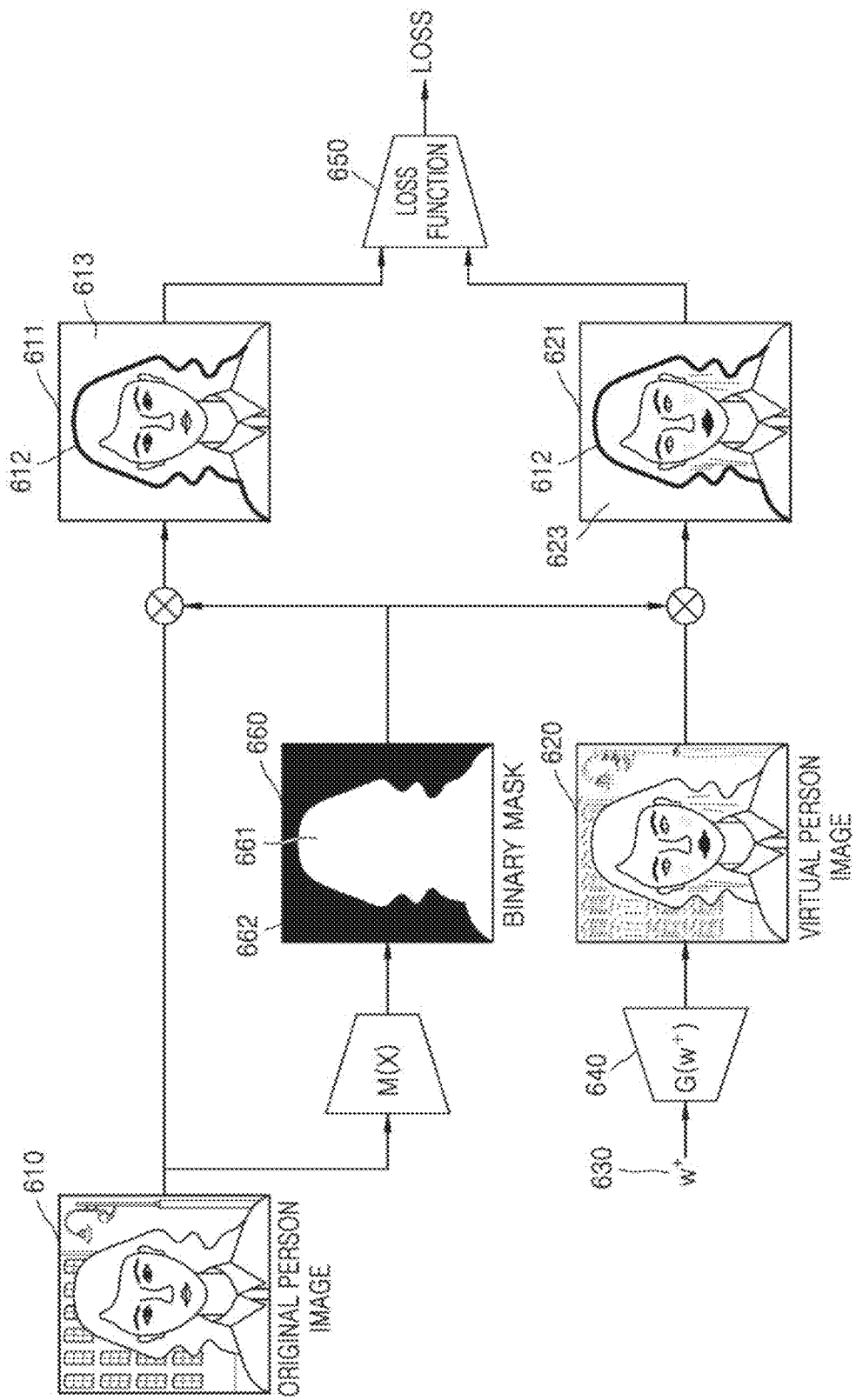
FIGS. 6A and 6B are diagrams for describing a process of optimizing a latent vector by using a binary mask or a softened binary mask, according to an embodiment.
Figure 6B:
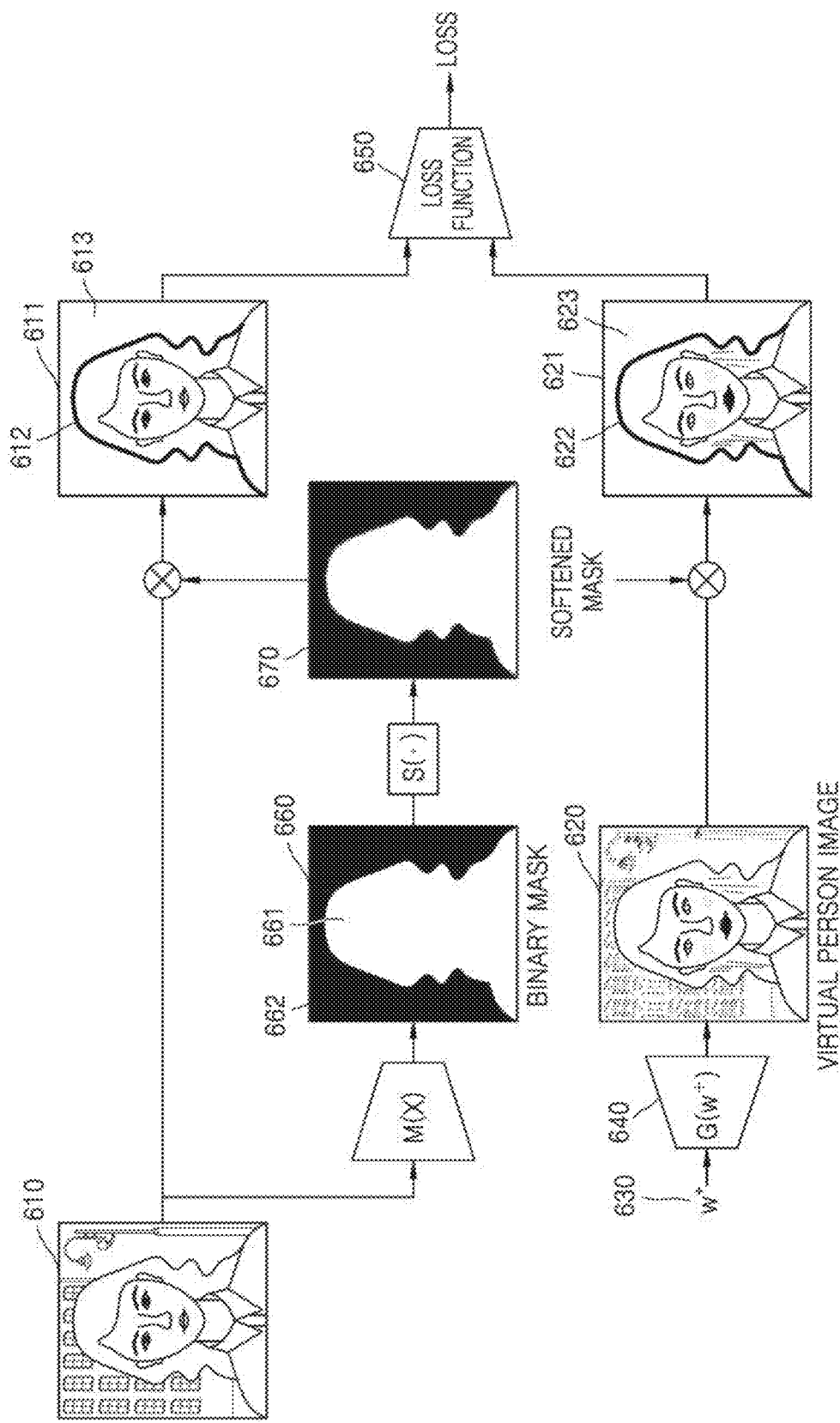

FIGS. 6A and 6B are diagrams for describing a process of optimizing a latent vector by using a binary mask or a softened binary mask, according to an embodiment.

The leveling apparatus may select an arbitrary latent vector 630 in a latent space and input the selected latent vector 630 to a generator 640. The generator 640 may be implemented as a GAN generator, a StyleGAN generator, a StyleGAN2 generator, and the like, but the implementation method of the generator 640 is not limited thereto. The generator 640 may generate a virtual person image 620 by receiving the latent vector 630 as an input.

In an embodiment, the leveling apparatus may optimize the latent vector 630 by focusing only on a person region (or foreground) and excluding background regions of an original person image 610 and the virtual person image 620.

In detail, from among an original person region 612 and an original background region 613 included in the original person image 610, the leveling apparatus may activate the original person region 612 and deactivate the original background region 613. Also, from among a virtual person region 622 and a virtual background region 623 included in the virtual person image 620, the leveling apparatus may activate the virtual person region 622 and deactivate the virtual background region 623. The leveling apparatus may optimize the latent vector 630 to increase identity similarity between an image of the original person region 612 and an image of the virtual person region 622.

Referring to FIG. 6A, the leveling apparatus may optimize a latent vector by using a binary mask.

In an embodiment, the leveling apparatus may use a binary mask 660 to activate a person region and deactivate a background region from an image.

In detail, the leveling apparatus may generate the binary mask 660 by extracting a boundary line between an original person region 661 and an original background region 662 included in the original person image 610. For example, pixels of the binary mask 660 corresponding to the original person region 661 may have a value of '1', and pixels of the binary mask 660 corresponding to the original background region 662 may have a value of '0'.

By applying the binary mask 660 to the original person image 610, the leveling apparatus may activate the original person region 612 and deactivate the original background region 613 from the original person image 610. By applying the binary mask 660 to the virtual person image 620, the leveling apparatus may activate the virtual person region 622 and deactivate the virtual background region 623 from the virtual person image 620. The leveling apparatus may generate a first image 611 as an original person image, to which the original binary mask 660 is applied and a second image 621 as a virtual person image, to which the binary mask 660 is applied.

The leveling apparatus may input the first image 611 and the second image 621 to a loss function 650. LPIPS may be used as the loss function 650, but is not limited thereto. The loss function 450 may calculate a loss as an output value. This may be expressed as Equation 2 below.

In Equation 2, $M_O$ denotes the binary mask 660, and $\odot$ denotes pixel-wise multiplication.

$$\mathcal{L}_{(\omega^+; X, M_O)} = \text{LPIPS}(X \odot M_O, G(\omega^+) \odot M_O) \quad \text{[Equation 2]}$$

The leveling apparatus may optimize the latent vector 630 in a direction in which loss is reduced. In the optimization process, the latent vector 630 may be continuously updated. As the loss of the loss function 650 decreases, the identity similarity between the image of the original person region 612 and the image of the virtual person region 622 may increase.

Referring to FIG. 6B, the leveling apparatus may optimize a latent vector by using a softened binary mask.

In an embodiment, the leveling apparatus may use a softened binary mask 670 to activate a person region and deactivate a background region from an image.

In detail, the leveling apparatus may generate the binary mask 660 by extracting a boundary line between the original person region 661 and the original background region 662 included in the original person image 610. For example, pixels of the binary mask 660 corresponding to the person region 661 may have a value of '1', and pixels of the binary mask 660 corresponding to the background region 662 may have a value of '0'. Also, by applying the binary mask 660 to the original person image 610, the leveling apparatus may activate the original person region 612 and deactivate the original background region 613 from the original person image 610.

The leveling apparatus may generate the softened binary mask 670 by softening the boundary line of the binary mask 660. For example, the leveling apparatus may generate the softened binary mask 670 by applying Gaussian blur to the boundary line between the original person region 661 and the original background region 662.

By applying the softened binary mask 670 to the original person image 610, the leveling apparatus may activate the original person region 612 and deactivate the original background region 613 from the original person image 610. Also, by applying the softened binary mask 670 to the virtual person image 620, the leveling apparatus may activate the virtual person region 622 and deactivate the virtual background region 623 from the virtual person image 620. The leveling apparatus may generate the first image 611 as an original person image, to which the softened binary mask 670 is applied, and the second image 621 as a virtual person image, to which the softened binary mask 670 is applied.

The leveling apparatus may input the first image 611 and the second image 621 to the loss function 650. LPIPS may be used as the loss function 650, but is not limited thereto. The loss function 450 may calculate a loss as an output value. This may be expressed as Equation 3 below.

In Equation 3, $M_s$ denotes the softened binary mask 670.

$$\mathcal{L}_{(\omega^+; X, M_s)} = \text{LPIPS}(X \odot M_s, G(\omega^+) \odot M_s) \quad \text{[Equation 3]}$$

According to the present disclosure, by applying a binary mask or a softened binary mask to an original person image and a virtual person image, a latent vector may be optimized by focusing only on a person region (or foreground) of each image and excluding a background region of each image, thereby increasing identity similarity between the original person image and the virtual person image and improving the image editing efficiency.

Figure 7:
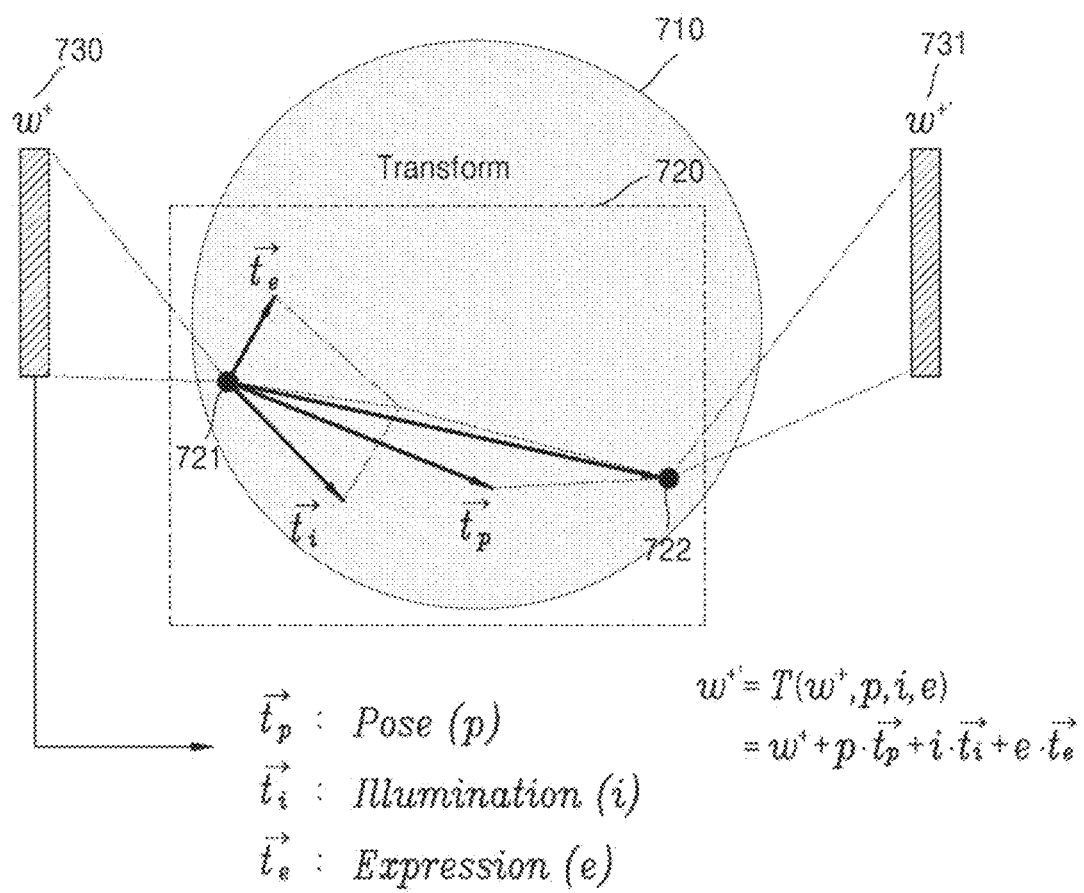
FIG. 7 is an example diagram for describing a method of manipulating an optimized latent vector, according to an embodiment.

FIG. 7 is an example diagram for describing a method of manipulating an optimized latent vector, according to an embodiment.

As described above with reference to FIGS. 6A to 6B, the leveling apparatus may optimize a latent vector by focusing only on a person region (or foreground) of each image and excluding a background region of each image by applying a binary mask or a softened binary mask to an original person image and a virtual person image.

The leveling apparatus may generate a levelled person image corresponding to the original person image by manipulating the latent vector optimized according to the method described above.

The leveling apparatus may set a first point 721 by mapping an optimized latent vector 730 to a latent space 710.

The leveling apparatus may obtain subspaces respectively corresponding to a plurality of semantic attributes of the original person image in the latent space 710. For example, the leveling apparatus may obtain subspaces respectively corresponding to a plurality of semantic attributes by using InterFaceGAN, but a method used for obtaining a subspace is not limited thereto.

The semantic attributes may include at least one of a pose attribute, an expression (expression) attribute, and an illumination attribute. In addition, as long as it is an attribute, whereby a person image may be levelled, the attribute may be included in the semantic attributes without limitation.

In an embodiment, the leveling apparatus may obtain a sub-$\vec{t}_p$ corresponding to a pose attribute (p), a subspace $\vec{t}_e$ corresponding to an expression attribute (e), and a subspace $\vec{t}_l$ corresponding to an illumination attribute (i).

The leveling apparatus may move the first point 721 to a second point 722 by performing a linear transformation 720 on each subspace to move a value of each subspace by a certain value.

The leveling apparatus may use an estimator to determine a certain value, to which the value of each subspace is to be moved. For example, the leveling apparatus may use FSA-Net as a pose attribute estimator and a VGG19 classifier as an expression estimator.

For example, the leveling apparatus may move the first point 721 to the second point 722 by moving the first point 721 by a certain value (p) with respect to a subspace $\vec{t}_p$, moving the first point 721 by a certain value (i) with respect to a subspace $\vec{t}_l$, and moving moving the first point 721 by a certain value (e) with respect to a subspace $\vec{t}_e$. The leveling apparatus may move a value of a subspace by a certain value by using a grid search method.

The leveling apparatus may obtain a manipulated latent vector 731 from the second point 722.

The above description may be expressed as Equation 4 below. In Equation 4, w⁺ denotes the optimized latent vector 730, and w⁺' denotes the manipulated latent vector 731.

$$\omega^{+\prime}=\omega^{+}+p\ \vec{t}_p+i\cdot\vec{t}_l+e\cdot\vec{t}_e \qquad \text{[Equation 4]}$$

Figure 8:
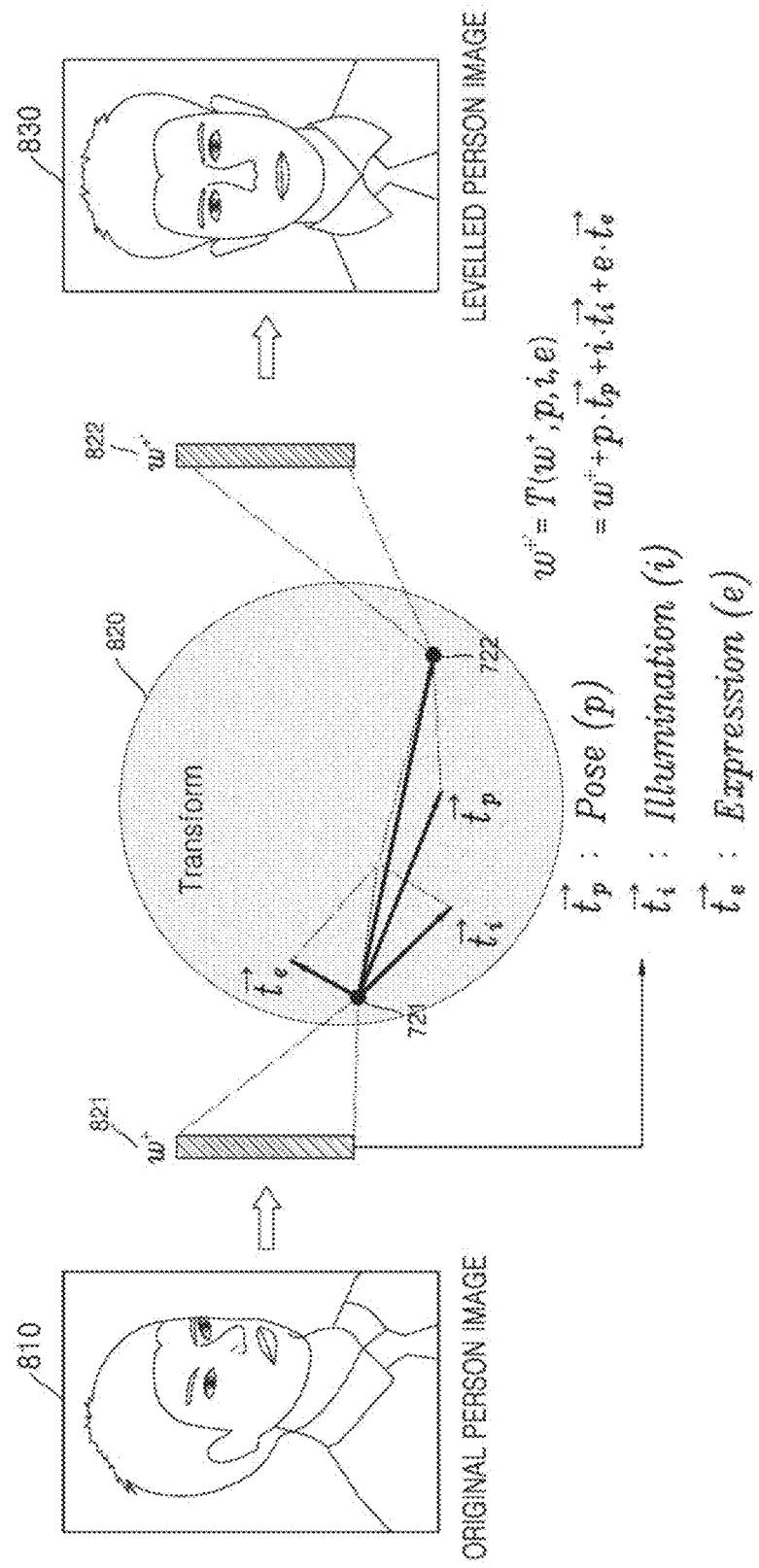
FIG. 8 is a diagram for describing an example of generating a levelled person image corresponding to an original person image, according to an embodiment.

FIG. 8 is a diagram for describing an example of generating a levelled person image corresponding to an original person image, according to an embodiment.

The leveling apparatus may receive an original person image 810 from the outside.

As described above with reference to FIGS. 6A to 6B, the leveling apparatus may optimize a latent vector by focusing only on a person region (or foreground) of each image and excluding a background region of each image by applying a binary mask or a softened binary mask to an original person image and a virtual person image.

In addition, as described above with reference to FIG. 7, by linearly transforming a subspace (820) to move, by a certain value, values of subspaces respectively corresponding to a plurality of semantic attributes of the original person image 810, the leveling apparatus may generate a manipulated latent vector 822 by manipulating an optimized latent vector 821.

The leveling apparatus may input the manipulated latent vector 822 to a generator, and the generator may generate a levelled person image 830 corresponding to the original person image 810 as an output.

Comparing the original person image 810 and the levelled person image 830 to each other, the original person image 810 is an image in which the face is facing the side, and the eyes are also staring at the side, and an emotionally dissatisfied state is expressed, whereas the levelled person image 830 is an image, which has a very high identity similarity to the original person image 810 and in which the face is facing the front, the eyes are also staring at the front, and an emotionally neutral state is expressed.

Figure 9:
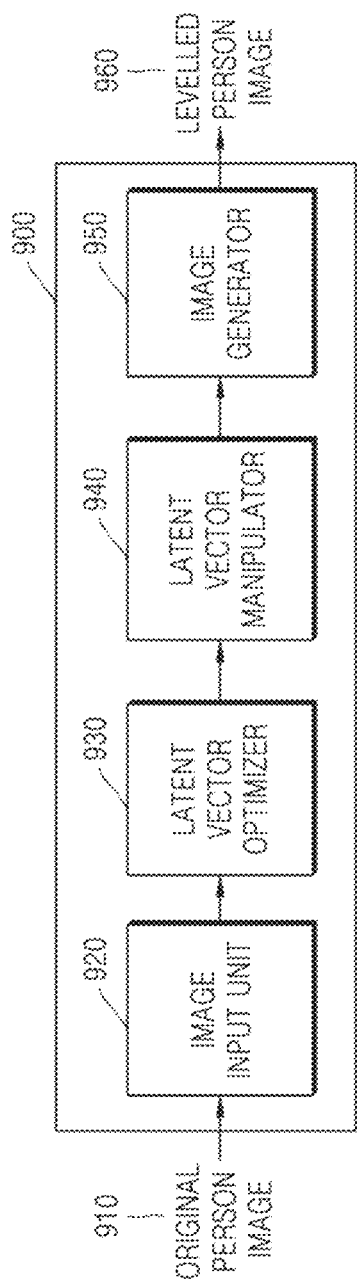
FIG. 9 is a block diagram illustrating a structure of a leveling apparatus according to an embodiment.

FIG. 9 is a block diagram illustrating a structure of a leveling apparatus according to an embodiment.

Referring to FIG. 9, a leveling apparatus 900 may include an image input unit 920, a latent vector optimizer 930, a latent vector manipulator 940, and an image generator 950.

The image input unit 920 may receive the original person image 910 from the outside. For example, the original person image 910 may include a person region and a background region, and may have a size of 1024×1024×3.

The image input unit 920 may exclude images that do not meet certain criteria from among original person image 910. In an embodiment, the image input unit 920 may exclude images in which the face in the original person image 1210 is blocked by a certain ratio or more.

The latent vector optimizer 930 may select an arbitrary latent vector in a latent space and generate a virtual person image based on the latent vector. Also, the latent vector optimizer 930 may optimize the latent vector such that identity similarity between the original person image 910 and the virtual person image increases. In order to increase the identity similarity between the original person image 910 and the virtual person image, the latent vector optimizer 930 may calculate loss between the original person image 910 and the virtual person image and optimize the latent vector in a direction in which loss is reduced.

The latent vector optimizer 930 may generate a binary mask by extracting a boundary line between an original person region and an original background region included in the original person image 910. Also, the latent vector optimizer 930 may create a softened binary mask by softening a boundary line of the binary mask. By applying the binary mask to the original person image 910 and the virtual person image, the latent vector optimizer 930 may activate the original person region and deactivate the original background region from the original person image 910, and activate a virtual person region and deactivate a virtual background region from the virtual person image. The latent vector optimizer 930 may optimize the latent vector such that identity similarity between an image of the original person region and an image of the virtual person region increases.

The latent vector manipulator 940 may obtain subspaces respectively corresponding to a plurality of semantic attributes of the original person image 910 in the latent space. The latent vector manipulator 940 may manipulate the optimized latent vector by linearly transforming the subspace to move a value of the subspace by a certain value. The latent vector manipulator 940 may move the value of the subspace by a certain value by using a grid search method. Meanwhile, the plurality of semantic attributes may include at least one of a pose attribute, an expression attribute, and an illumination attribute, but is not limited thereto.

The image generator 950 may generate a levelled person image 960 by using the manipulated latent vector. The levelled person image 960 is an image corresponding to the original person image 910. For example, when comparing the original person image 910 and the levelled person image 960 to each other, the original person image 910 may be an image in which the face is facing the side, and the eyes are also staring at the side, and an emotionally dissatisfied state is expressed, whereas the levelled person image 960 may be an image, which has a very high identity similarity to the original person image 910 and in which the face is facing the front, the eyes are also staring at the front, and an emotionally neutral state is expressed.

Figure 10:
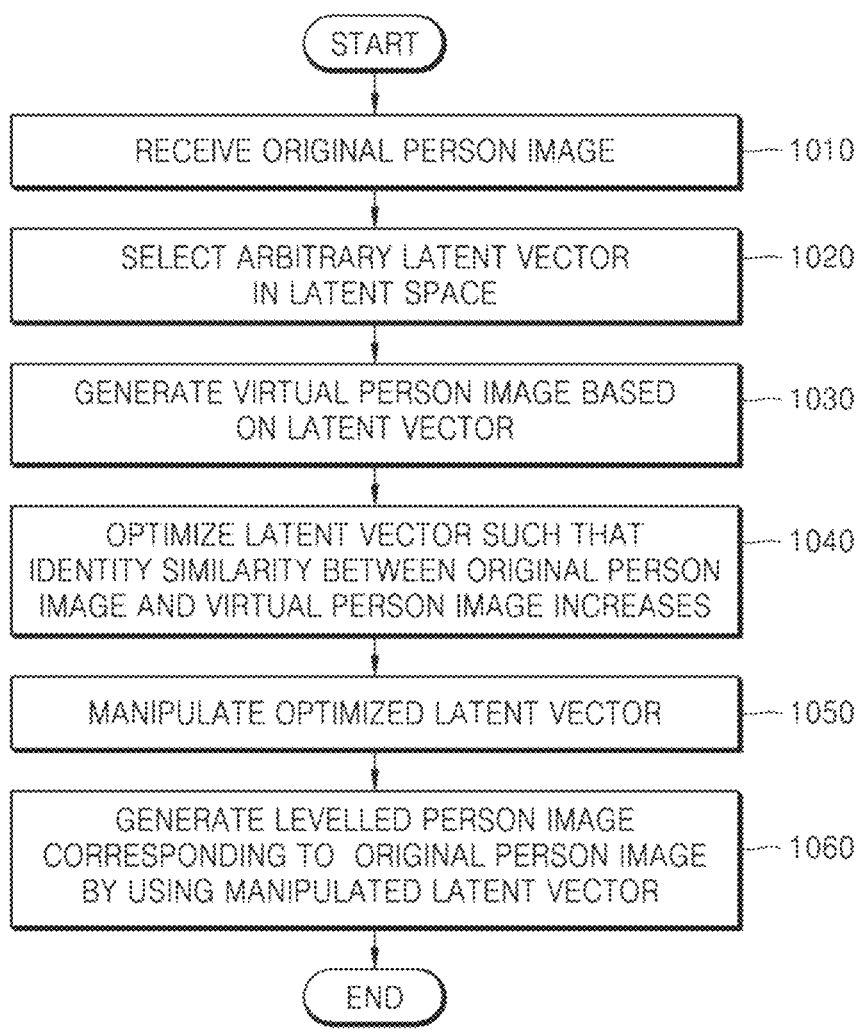
FIG. 10 is a flowchart of a method of performing leveling of a person image, according to an embodiment.

FIG. 10 is a flowchart of a method of performing leveling of a person image, according to an embodiment.

Referring to FIG. 10, in operation 1010, a processor may receive an original person image.

In an embodiment, the processor may exclude the original person image when a face in the original person image is blocked by a certain ratio or more or when the eyes and mouth of the face of the original person image are not aligned.

In operation 1020, the processor may select a latent vector in a latent space.

In an embodiment, the processor may select a mode in the latent space as the arbitrary latent vector or randomly select the arbitrary latent vector, but the selection method is not limited thereto.

In operation 1030, the processor may generate a virtual person image based on the latent vector.

The processor may generate a virtual person image by inputting and outputting a latent vector to the trained generator described above with reference to FIGS. 1 to 3.

In operation 1040, the processor may optimize the latent vector such that the identity similarity between the original person image and the virtual person image increases.

The processor may calculate a loss between the original person image and the virtual person image, and optimize the latent vector in a direction in which the loss is reduced.

The processor may activate an original person region and deactivate an original background region from among the original person region and the original background region included in the original person image. Also, from among a virtual person region and a virtual background region included in the virtual person image, the processor may activate the virtual person region and deactivate the virtual background region. The processor may optimize the latent vector such that identity similarity between an image of the original person region and an image of the virtual person region increases.

The processor may generate a binary mask by extracting a boundary line between the original person region and the original background region included in the original person image. By applying a binary mask to the original person image and the virtual person image, the processor may activate the original person region and deactivate the original background region from the original person image, and activate the virtual person region and deactivate the virtual background region from the virtual person image. The processor may optimize the latent vector such that identity similarity between an image of the original person region and an image of the virtual person region increases.

The processor may generate a softened binary mask by softening a boundary line of the binary mask. The processor may optimize the latent vector by applying the softened binary mask, instead of the binary mask, to the original person image and the virtual person image.

In operation 1050, the processor may manipulate the optimized latent vector.

The processor may obtain subspaces respectively corresponding to a plurality of semantic attributes of the original person image in the latent space. The processor may manipulate the optimized latent vector by linearly transforming the subspace to move values of the subspaces by a certain value. The processor may move the value of the subspace by a certain value by using a grid search method.

The plurality of semantic attributes may include at least one of a pose attribute, an expression attribute, and an illumination attribute.

In operation 1060, the processor may generate a levelled person image corresponding to the original person image by using the manipulated latent vector.

Figure 11:
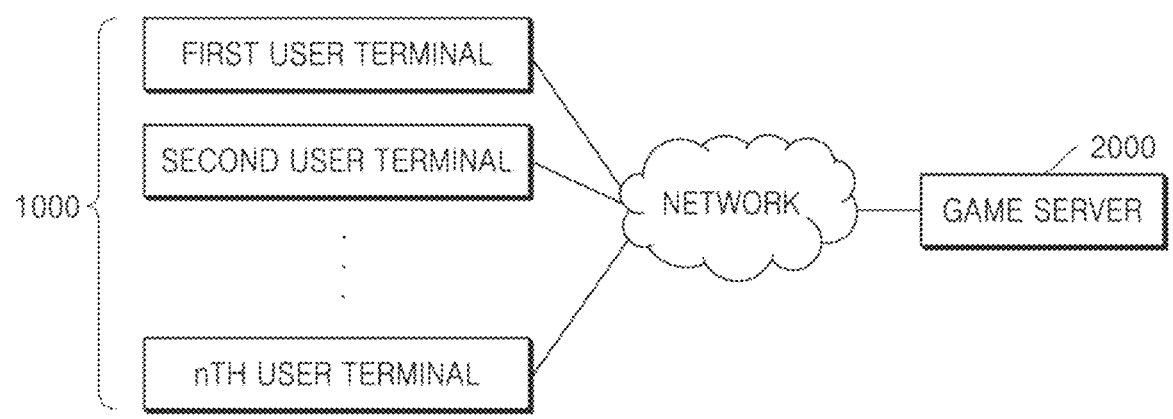
FIG. 11 is a diagram of a system including a user terminal and a game server, according to an embodiment.

FIG. 11 is a diagram of a system including a user terminal and a game server, according to an embodiment.

A system according to an embodiment may include a plurality of user terminals 1000 and a game server 2000.

The user terminal 1000 may communicate with each other or communicate with other nodes, through a network.

The user terminal 1000 may be a smartphone, a tablet personal computer (PC), a PC, a smart TV, a mobile phone, a laptop, and other mobile or non-mobile computing devices. Also, the user terminal 1000 may be a wearable device such as glasses and a hair band having a communication function and a data processing function. The user terminal 1000 may include all types of devices capable of communicating with other devices through a network.

The game server 2000 may be implemented as a computer device or a plurality of computer devices that communicate over a network to provide commands, code, files, content, services, and the like.

The user terminal 1000 and the game server 2000 may perform communication by using a network. The game server 2000 may provide a system for exchanging game data with the user terminal 1000 through a network and allowing users to play a game through the user terminal 1000.

The game data may include user character information. The user character information may include, for example, image information of a character, level information of the character, information about game money held by the character, information about items possessed by the character, skill information of the character, stat information of the character, information about the game progress of the character, etc.

The network may include a local area network (LAN), a wide area network (WAN), a value-added network (VAN), a mobile radio communication network, a satellite communication network, and combinations thereof, and refers to a data communication network in a comprehensive sense, which enables each of the network constituent entities illustrated in FIG. 1 to communicate smoothly with each other, and may include a wired Internet, a wireless Internet, and a mobile wireless communication network. In addition, wireless communication may be, for example, wireless LAN (Wi-Fi), Bluetooth, Bluetooth low energy, ZigBee, Wi-Fi Direct (WFD), ultra wideband (UWB), infrared communication (infrared Data Association (IrDA), or Near Field Communication (NFC), but is not limited thereto.

Figure 12:
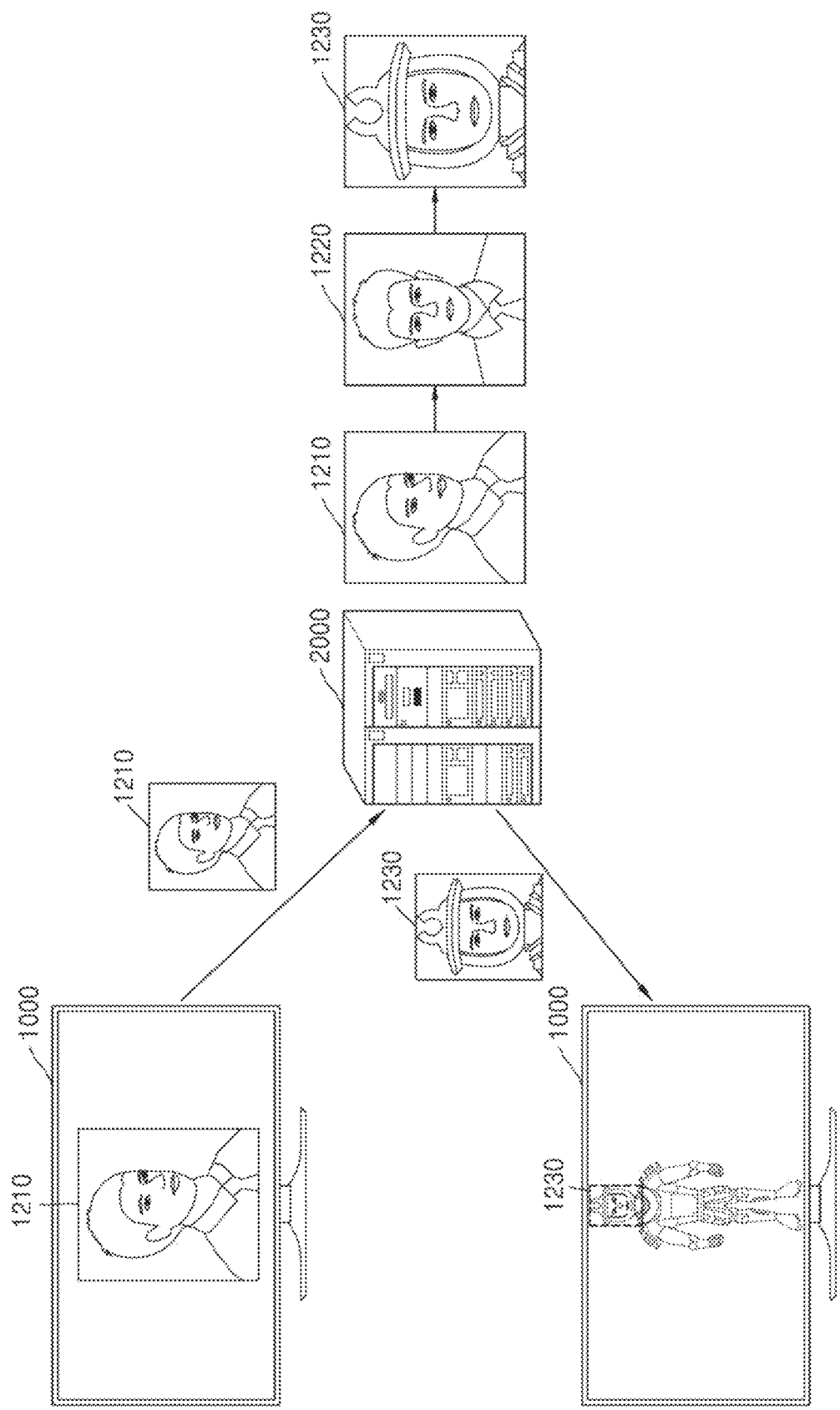
FIG. 12 is a diagram for describing a method of generating a character face image, according to an embodiment.

FIG. 12 is a diagram for describing a method of generating a character face image, according to an embodiment.

Referring to FIG. 12, the user terminal 1000 may transmit an original person image 1210 to the game server 2000. The original person image 1210 may include an image including a user's face.

The game server 2000 may determine whether the original person image 1210 received from the user terminal 1000 is in a levelled state. For example, the game server 2000 may determine whether the original person image 1210 is in a levelled state, based on a pose, an expression, an illumination, or the like of the original person image 1210.

The game server 2000 may exclude images that do not meet certain criteria among original person images 1210. In an embodiment, the game server 2000 may exclude original person images 1210 in which a face is blocked by a certain ratio or more. In this case, the game server 2000 may make request to the user terminal 1000 to retransmit an image.

In response to a determination that the original person image 1210 is not levelled, the game server 2000 may convert the original person image 1210 into a levelled person image 1220.

The game server 2000 may convert the original person image 1210 into the levelled person image 1220 based on the method described above with reference to FIGS. 1 to 10. Converting the original person image 1210 into the levelled person image 1220 may have the same meaning as generating the levelled person image 1220 corresponding to the original person image 1210.

The game server 2000 may generate a character face image 1230 corresponding to the levelled person image 1220. The game server 2000 may generate a character face image 1230 corresponding to the levelled person image 1220 by considering various factors such as lineaments, skin color, hair color, eye shape, eye color, nose shape, mouth shape, and eye-nose-mouth arrangement of the levelled person image 1220.

When a character face image is generated based on a person image instead of a levelled person image, similarity between the character face image and the original person image may be very low. According to the present disclosure, an original person image is converted into a levelled person image, and then a character face image is generated based on the levelled person image, thereby generating a character face image having a high similarity with respect to the original person image.

Figure 13:
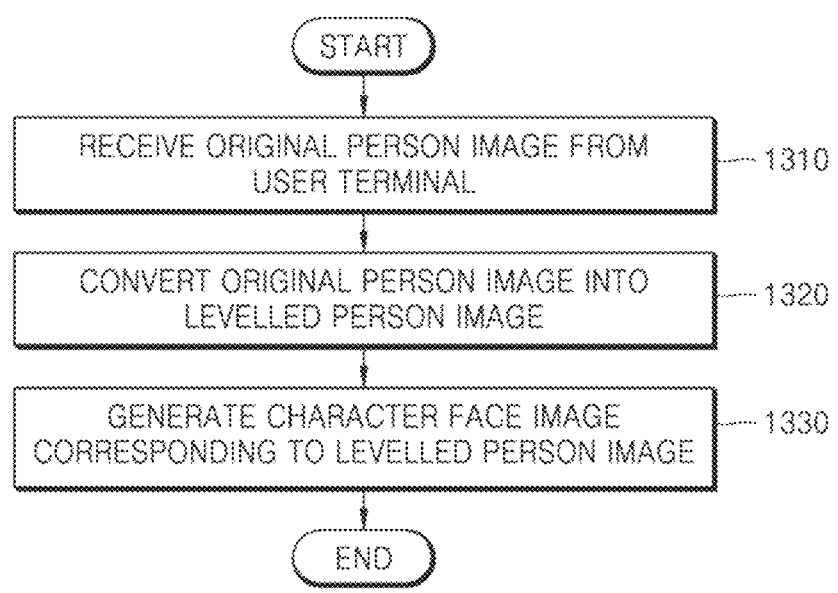
FIG. 13 is a flowchart of a method of generating a character face image, according to an embodiment.

FIG. 13 is a flowchart of a method of generating a character face image, according to an embodiment.

Referring to FIG. 13, in operation 1310, the processor may receive an original person image from the user terminal 1000 through a communication unit.

The processor may determine whether the original person image is in a levelled state. The processor may convert the original person image into a levelled person image based on the determination.

In an embodiment, the processor may exclude the original person image when a face in the original person image is blocked by a certain ratio or more, or when the eyes and mouth of the face in the original person image are not aligned.

In operation 1320, the processor may convert the original person image into a levelled person image.

The processor may select a latent vector in a latent space. The processor may generate a virtual person image based on the latent vector. The processor may optimize the latent vector to increase identity similarity between the original person image and the virtual person image. The processor may manipulate the optimized latent vector. The processor may convert the original person image into a levelled person image by using the manipulated latent vector.

In addition, the processor may generate a binary mask by extracting a boundary line between an original person region and an original background region included in the original person image. By applying the binary mask to the original person image and the virtual person image, the processor may activate the original person region and deactivating the original background region from the original person image, and activate the virtual person region and deactivate the virtual background region from the virtual person image. The processor may optimize the latent vector such that identity similarity between an image of the original person region and an image of the virtual person region increases.

In operation 1330, the processor may generate a character face image corresponding to the levelled person image.

The processor may generate a character face image corresponding to the levelled person image by considering various factors such as lineaments, skin color, hair color, eye shape, eye color, nose shape, mouth shape, and eye-nose-mouth arrangement of the levelled person image.

Figure 14:
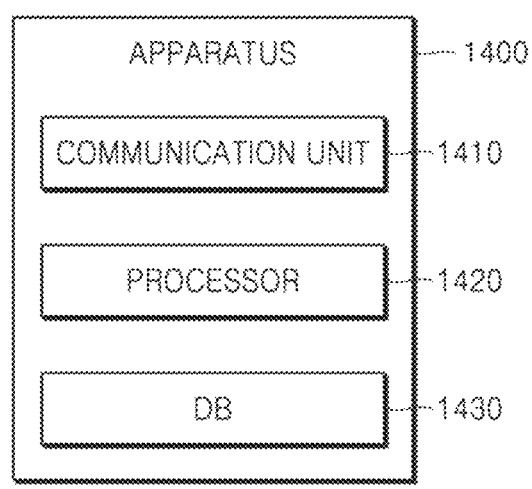
FIG. 14 is a block diagram of an apparatus according to an embodiment.

FIG. 14 is a block diagram of an apparatus according to an embodiment.

An apparatus 1400 of FIG. 14 may be the leveling apparatus 900 or the game server 2000.

Referring to FIG. 14, the apparatus 1400 may include a communication unit 1410, a processor 1420, and a database (DB) 1430. In the apparatus 1400 of FIG. 14, only components related to the embodiment are illustrated. Accordingly, it will be understood by those skilled in the art that other general-purpose components may be further included in addition to the components illustrated in FIG. 14.

The communication unit 1410 may include one or more components that enable wired/wireless communication with other nodes. For example, the communication unit 1410 may include at least one of a short-range communication unit (not shown), a mobile communication unit (not shown), and a broadcast receiving unit (not shown).

The DB 1430 is a hardware component for storing various data processed in the apparatus 1400, and may store a program for processing and controlling the processor 1420. The DB 1430 may store payment information, user information, and the like.

The DB 1430 may include random access memory (RAM) such as dynamic random access memory (DRAM), static random access memory (SRAM), or the like, read-only memory (ROM), electrically erasable programmable read-only memory (EEEPROM), CD-ROM, Blu-ray or other optical disk storage, hard disk drive (HDD), solid state drive (SSD), or a flash memory.

The processor 1420 controls the overall operation of the apparatus 1400. For example, the processor 1420 may generally control an input unit (not shown), a display (not shown), the communication unit 1410, the DB 1430, and the like by executing programs stored in the DB 1430. The processor 1420 may control the operation of the apparatus 1400 by executing the programs stored in the DB 1430. The processor 1420 may control at least some of the operations of the leveling apparatus 900 or the game server 2000 described above with reference to FIGS. 1 to 13.

The processor 1420 may be implemented using at least one of application specific integrated circuits (ASICs), digital signal processors (DSPs), digital signal processing devices (DSPDs), programmable logic devices (PLDs), field programmable gate arrays (FPGAs), controllers, micro-controllers, microprocessors, and other electrical units for performing other functions.

Embodiments according to the present disclosure may be implemented in the form of a computer program that can be executed through various components on a computer, and such a computer program may be recorded in a computer-readable medium. Examples of the computer-readable medium may include magnetic media (e.g., hard disks, floppy disks, magnetic tapes, etc.), optical recording media (e.g., CD-ROMs, or DVDs), magneto-optical media (e.g., floptical disks), and hardware devices specifically configured to store and execute program instructions (e.g., ROM, RAM, flash memories, etc.).

The computer programs may be specifically designed and configured for the present disclosure or may be well-known and available to one of ordinary skill in the field of computer software. Examples of the program instructions are high-level language codes that can be executed by a computer by using an interpreter or the like as well as machine language codes made by a compiler.

Also, the method according to various embodiments of the present disclosure may be included in a computer program product and provided in that form. The computer program product may be traded as a product between a seller and a buyer. The computer program product may be distributed in the form of a storage medium that is readable using a device (e.g., compact disc read only memory (CD-ROM)) or may be directly distributed online through an application store (e.g., Google Play Store™) or between two user devices (e.g., downloaded or uploaded). For online distribution, at least a part of the computer program product may be temporarily stored in a storage medium that is readable using a device, or may be temporarily generated. The storage medium may be a server of the manufacturer, a server of the application store, or a memory of a relay server.

According to the present disclosure, by applying a binary mask or a softened binary mask to an original person image and a virtual person image, a latent vector may be optimized by focusing only on a person region (or foreground) of each image and excluding a background region of each image, thereby increasing identity similarity between the original person image and the virtual person image and improving the image editing efficiency.

In addition, according to the present disclosure, an original person image is converted into a levelled person image, and then a character face image is generated based on the levelled person image, thereby generating a character face image having a high similarity with respect to the original person image.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A method of performing leveling of a person image, the method comprising:
   receiving an original person image;
   selecting an arbitrary latent vector in a latent space;
   generating a virtual person image based on the latent vector;
   activating an original person region and deactivating an original background region from among the original person region and the original background region included in the original person image;
   activating a virtual person region and deactivating a virtual background region from among the virtual person region and the virtual background region included in the virtual person image;
   optimizing the latent vector such that identity similarity between an image of the original person region and an image of the virtual person region increases;
   manipulating the optimized latent vector; and
   generating a levelled person image, in which a person stares forward and shows a neutral emotion, and in which an illumination is illuminating a front of the person's face, corresponding to the original person image, by using the manipulated latent vector.

2. The method of claim 1, wherein the optimizing comprises calculating a loss between the original person image and the virtual person image and optimizing the latent vector in a direction in which the loss is reduced.

3. The method of claim 1, wherein the optimizing comprises:
   generating a binary mask by extracting a boundary line between the original person region and the original background region included in the original person image;
   by applying the binary mask to the original person image and the virtual person image, activating the original person region and deactivating the original background region from the original person image, and activating the virtual person region and deactivating the virtual background region from the virtual person image; and
   optimizing the latent vector such that identity similarity between an image of the original person region and an image of the virtual person region increases.

4. The method of claim 3, wherein the generating of the binary mask comprises generating a softened binary mask by softening the boundary line of the binary mask.

5. The method of claim 1, wherein the manipulating comprises:
   obtaining subspaces respectively corresponding to a plurality of semantic attributes of the original person image in the latent space; and
   manipulating the optimized latent vector by linearly transforming the subspaces to move values of the subspaces by a certain value.

6. The method of claim 5, wherein the values of the subspaces are moved by the certain value by using a grid search method.

7. The method of claim 5, wherein the semantic attributes comprise at least one of a pose attribute, an expression attribute, and an illumination attribute.

8. The method of claim 1, further comprising excluding the original person image when a face in the original person image is blocked by a certain ratio or more, or when the eyes and the mouth in the original person image are not aligned.

9. A computer-readable recording medium having recorded thereon a program for executing the method of claim 1 on a computer.

10. An apparatus for performing leveling of a person image, the apparatus comprising:
    a memory storing at least one program; and
    a processor configured to perform an operation by executing the at least one program,
    wherein the processor is configured to:
      receive an original person image including a person object,
      select an arbitrary latent vector in a latent space,
      generate a virtual person image based on the latent vector,
      activate an original person region and deactivating an original background region from among the original person region and the original background region included in the original person image,
      activate a virtual person region and deactivating a virtual background region from among the virtual person region and the virtual background region included in the virtual person image,
      optimize the latent vector such that identity similarity between an image of the original person region and an image of the virtual person region increases, manipulate the optimized latent vector, and generate a levelled person image, in which a person stares forward and shows a neutral emotion, and in which an illumination is illuminating a front of the person's face, corresponding to the original person image, by using the manipulated latent vector.

11. A method of generating a character face image, the method comprising:

receiving an original person image from a user terminal;

selecting an arbitrary latent vector in a latent space;

generating a virtual person image based on the latent vector;

activating an original person region and deactivating an original background region from among the original person region and the original background region included in the original person image;

activating a virtual person region and deactivating a virtual background region from among the virtual person region and the virtual background region included in the virtual person image;

optimizing the latent vector such that identity similarity between an image of the original person region and an image of the virtual person region increases;

manipulating the optimized latent vector;

converting the original person image into a levelled person image, in which a person stares forward and shows a neutral emotion, and in which an illumination is illuminating a front of the person's face, by using the manipulated latent vector; and generating the character face image to correspond to the levelled person image.

12. The method of claim 11, wherein the converting comprises:

determining whether the original person image is in a levelled state; and converting the original person image into the levelled person image based on the determination.

13. The method of claim 11, further comprising excluding the original person image when a face in the original person image is blocked by a certain ratio or more, or when the eyes and the mouth in the original person image are not aligned.

14. The method of claim 11, wherein the optimizing comprises:

generating a binary mask by extracting a boundary line between the original person region and the original background region included in the original person image; and by applying the binary mask to the original person image and the virtual person image, activating the original person region and deactivating the original background region from the original person image, and activating the virtual person region and deactivating the virtual background region from the virtual person image.

15. A game server for generating a character face image, the game server comprising:

a communication unit;

a memory storing at least one program; and a processor configured to perform an operation by executing the at least one program, wherein the communication unit receives an original person image from a user terminal, and wherein the processor is configured to:

select an arbitrary latent vector in a latent space, generate a virtual person image based on the latent vector, activate an original person region and deactivating an original background region from among the original person region and the original background region included in the original person image, activate a virtual person region and deactivating a virtual background region from among the virtual person region and the virtual background region included in the virtual person image, optimize the latent vector such that identity similarity between an image of the original person region and an image of the virtual person region increases, manipulate the optimized latent vector, convert the original person image into a levelled person image, in which a person stares forward and shows a neutral emotion, and in which an illumination is illuminating a front of the person's face, by using the manipulated latent vector, and generate the character face image to correspond to the levelled person image.

\* \* \* \* \*